GLASS SHOWING ELECTRICAL SWITCHING PHENOMENA

Filed Feb. 7, 1972 2 Sheets-Sheet 1

GLASS SHOWING ELECTRICAL SWITCHING PHENOMENA

Filed Feb. 7, 1972 2 Sheets-Sheet 2

United States Patent Office 3,782,958
Patented Jan. 1, 1974

3,782,958
GLASS SHOWING ELECTRICAL SWITCHING PHENOMENA

Adli Bishay and Mahmoud Aly El Hamamsy, Cairo, and Mohammed Hosny Omar, Heliopolis, Egypt, assignors to the United States of America as represented by the Secretary of the Air Force
Filed Feb. 7, 1972, Ser. No. 223,831
Int. Cl. C03c *3/14, 3/30;* H01b *1/06*
U.S. Cl. 106—47 R 4 Claims

ABSTRACT OF THE DISCLOSURE

A glass composition is provided that consists essentially of an alkali or alkaline earth metal borate containing iron. The glass is useful in fabricating memory switching devices that can be used, for example, in digital equipment and display units, and thermistors.

FIELD OF THE INVENTION

Figure 1:
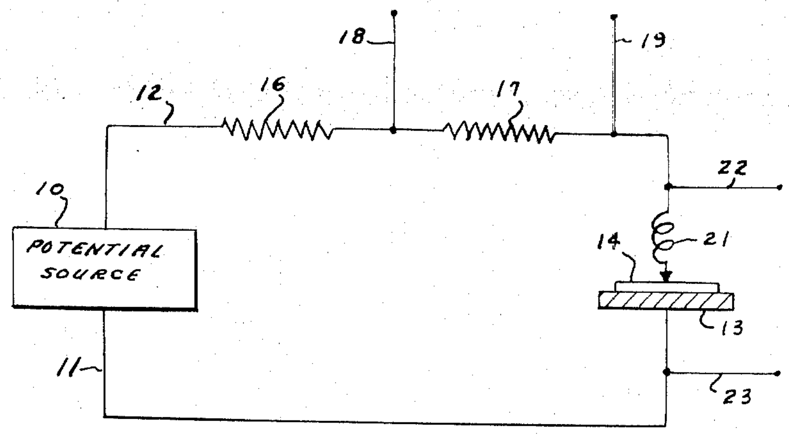

This invention relates to glass compositions that possess both electrical switching and memory capabilities. In one aspect it relates to a method for producing the glass compositions.

BACKGROUND OF THE INVENTION

Electrical switching may be defined as the rapid transition from a high resistance (off state) to a low resistance (on state). While the basic switch is the mechanical switch, any device which has or can be made to have two distinct states may have an application in digital equipment. For example, semiconductor transistors and diodes in a short period of time have become the most useful, versatile, and widely used devices in switching applications. Among the many devices which are used and will continue to be used in this area, only semiconductors possess the broad combination of features that are so desirable. These features include low power consumption, high speed, small size, low filament power, low cost, remarkably long life and ease of operation.

The semiconductors most widely used are composed of germanium and silicon which are crystalline in structure with their atoms arranged in an ordered array. While these materials in their purest form are highly resistive, their conductivity can be increased by the addition of a small amount of impurities. These impurities introduce new energy levels, thereby greatly influencing the electrical properties of the semiconductors. These new energy levels will be occupied by electrons or holes which will contribute to the conduction process.

Non-crystalline solids exhibiting electronic conduction include oxide glasses, the so-called chalcogenide glasses, glassy elements such as carbon, and a variety of amorphous films. Non-crystalline solids can be formed by several techniques. The two most common ones are (1) by rapid cooling of the melt and (2) by condensation of the vapor onto cold substrates. The former is generally referred to as glasses and the latter as amorphous solids, but the common terminology for both is that of semiconductor glasses.

The most unusual properties of the semiconductor glasses are the current-voltage characteristics which can be observed when a point contact is set down on a thin slice of glass. These observations indicate that there are two regions of positive resistance together with a region of negative resistance. One of the two regions of positive resistance is a low resistance state, typically less than 200 ohms, while the other is of high resistance, typically greater than $10^5$ ohms.

The reversible switching observed in semiconductor glasses is of two types, namely, threshold switching and memory switching. Threshold switching occurs when a sufficiently high voltage switches the material from the high resistance to the low resistance state. If the current is lowered sufficiently in the low resistance state, the material reverts to the original high resistance. This is known as astable switching. In memory switching, the device exhibits a stable negative resistance state. Thus, increasing the applied voltage at the contact shows that the semiconductor glass is a voltage-dependent resistor until it reaches a certain threshold voltage. Thereafter, a negative resistance is observed until a certain critical current is reached. Upon exceeding this critical current, the semiconductor glass switches to the low resistance or "on" state. The voltage can now be completely turned off while the sample is in the conducting state and it will remain in that state. A current pulse generally reverts the semiconductor from the low resistance "on" state to the high resistance "off" state. This is called bi-stable switching.

A number of chalcogenide glasses have been reported in the literature as showing switching and memory effects. These include the glass system (As-Ti-I) [Advances in Glass Technology, 357, Plenum Press, New York, N.Y. (1962)], and $TlAs(Se, Te)_2$ glass [Radio Eng. Electron. USSR, 8, 1941 (1963)]. A rapid and reversible transition between a highly resistive and conductive state effected by an electrical field has also been observed in the As-Te-Si-Ge system. Similar switching behavior has also been observed in thin films of boron, silicon and germanum, in oxide film of $ZrO_2$, in CuO powder and in iron oxide.

It is an object of this invention to provide an improved semiconductor glass which shows both switching and memory effects.

Still another object is to provide a glass composition which is made from comparatively inexpensive materials.

A further object is to provide a glass composition having a high melting point, an important property when used in certain switching applications.

A still further object of the invention is to provide a method for producing the glass composition which exhibits especial conductivity properties.

A still further object is to provide a glass composition which is particularly suitable for use in fabricating memory switching devices.

Other objects and advantages of the invention will become apparent to those skilled in the art upon consideration of the accompanying disclosure and the drawings in which:

FIG. 1 is a diagram showing the circuit used in studying the current-voltage characteristics of the semiconductor glass of this invention; and FIGS. 2, 3, 4, and 5 are traces from an oscilloscope showing the current-voltage characteristics of samples of the semiconductor glass.

SUMMARY OF THE INVENTION

The present invention resides in a glass composition which comprises an alkali or alkaline earth metal borate or lead borate, each containing iron. More specifically, the glass composition can be represented by the following formula in which the ranges are mol percentages:

$$(35\text{–}60)B_2O_3\cdot(20\text{–}55)M_xO\cdot(10\text{–}35)Fe_2O_3$$

wherein M is an alkali metal, an alkaline earth metal or lead, and $x$ is equal to 1 when M is an alkaline earth metal or lead and 2 when M is an alkali metal. Examples of alkali and alkaline earth metals include potassium, cesium, barium and calcium. It is generally preferred to utilize a glass composition in which $M_xO$ is calcium oxide. Furthermore, the preferred glass composition can be represented by the following formula in which the numerals are mol percentages: $40B_2O_3\cdot30CaO\cdot30Fe_2O_3$.

In one embodiment the invention resides in a method of preparing the glass composition which comprises mixing in a dry state precursors of $B_2O_3$ and $M_xO$ with $Fe_2O_3$ or a precursor of $Fe_2O_3$, wherein M and $x$ are as defined above; heating the resulting mixture at a temperature and for a period of time sufficient to provide a melt or glass consisting essentially of $B_2O_3$, $M_xO$ and $Fe_2O_3$; pouring the glass into at least one mold; placing the mold in a heating zone maintained at a temperature sufficiently high to anneal the glass; and thereafter gradually cooling the heating zone to room temperature so as to obtain an annealed glass.

To obtain film specimens, the glass recovered from the cooling step, generally in the form of discs, can be ground to a desired thickness. Alternatively, the discs can be remelted under a vacuum, e.g., on a molybdenum boat, to obtain film specimens.

As a precursor for $B_2O_3$, it is generally preferred to use boric acid. Except when M is lead, the precursors employed for the $M_xO$ compounds are the carbonates of the metal M, such as calcium or potassium carbonate. In the case where M is lead, lead oxide itself is usually used. When utilizing the foregoing materials in preparing the glass, the heating and annealing steps are generally conducted under normal atmospheric conditions. Ammonium pentaborate can also be used as a precursor for $B_2O_3$ while ferrous oxalate can be employed instead of ferric oxide. When utilizing these later two materials, the heating step is preferably conducted under reducing conditions, e.g., in the presence of hydrogen. However, it is to be understood that it is within the scope of the invention to carry out the step in the presence of an inert gas, such as nitrogen or argon.

The amount of each precursor used is dependent upon the composition of the glass that is desired. For example, in preparing a $40B_2O_3 \cdot 30CaO \cdot 30Fe_2O_3$, the mol ratio of boric acid to calcium carbonate to ferric oxide to be used is 1:0.375:0.375. The mol ratio of precursors to be employed in preparing a particular glass composition can be readily determined by one skilled in the art. In general, the mixture of precursors contains 35 to 85 mol percent of boric acid, 10 to 40 mol percent of the alkali or alkaline earth metal carbonate or lead oxide, and 5 to 25 mol percent of ferric oxide, based on a total of 100 mol percent.

The heating step is usually carried out at a temperature in the range of about 1050 to 1350° C. The actual temperature used will depend upon the composition of the mixture to be melted. The heating period is sufficiently long to ensure formation of the $B_2O_3$ and $M_xO$, and can vary within rather wide limits. However, heating periods ranging from about 2 to 5 hours are generally sufficient. The annealing step is usually conducted by placing the glass in a heating zone at a temperature in the range of about 500 to 700° C. and then allowing the glass to cool gradually to room temperature. The annealing procedure generally takes from 8 to 24 hours.

In a preferred embodiment, the semiconductor glass is in the form of a film having a thickness in the range of about 50 to 150 microns. The film is prepared by remelting the glass discs under a vacuum, e.g., of $10^{-5}$ mm. Hg, in a container, such as a molybdenum boat. The amount of glass to be melted and the depth of the molybdenum boat are such as to provide a film of desired thickness. The melted glass is rapidly cooled, e.g., in about 0.5 to 1.5 minutes, to room temperature, thereby forming the glass film.

A better understanding of the invention can be obtained by referring to the following illustrative examples which are not intended, however, to be unduly limitative of the invention.

EXAMPLE I

A series of semiconductor glasses was prepared that had the following compositions expressed in mol percentages:

(a) $60B_2O_3 \cdot 30CaO \cdot 10Fe_2O_3$
(b) $56B_2O_3 \cdot 30CaO \cdot 14Fe_2O_3$
(c) $43B_2O_3 \cdot 30CaO \cdot 27Fe_2O_3$
(d) $40B_2O_3 \cdot 30CaO \cdot 30Fe_2O_3$
(e) $38B_2O_3 \cdot 30CaO \cdot 32Fe_2O_3$ The procedure followed in preparing each glass was to heat a mixture of boric acid, calcium carbonate and ferric oxide, all in the dry state, to a temperature of about 1100° C. The amount of each component in each mixture was that necessary to provide glasses having the above-indicated compositions. The mixture was maintained at about 1100° C. under normal atmospheric conditions for 3 hours and then poured into molds. The molds were then placed in a muffle furnace at a temperature of about 600° C. Thereafter, the furnace was turned off and allowed to cool gradually to room temperature. This annealing procedure took about 12 hours.

Bulk samples were cut from the several glass compositions and ground to specimens in the form of thin layers about 0.2 mm. thick and having an area of about $10^{-4}$ mm.$^2$. The current-voltage characteristics of the specimens were determined, using the electrical circuit shown in FIG. 1. As seen from FIG. 1, the circuit includes a potential source 10 which is either a source of alternating or direct current voltage. Connected to the potential source are ends of electrical leads 11 and 12. The other end of lead 11 is connected to a copper electrode 13 on which the specimen 14 of semiconductor glass to be tested is positioned. Resistors 16 and 17 are connected in series in lead 12. Resistor 16 is a current limiting resistor while resistor 17 is used to determine the current through specimen 14 by measuring the potential drop across the resistor. Thus, electrical leads 18 and 19 are each attached to lead 12 on either side of resistor 17. The other end of lead 12 is connected to electrode 21 in the form of a tungsten electrode applied with a controlled pressure to the upper face of specimen 14. Electrical leads 22 and 23 are connected to lead 12, one on either side of electrodes 13 and 21. In making alternating current measurements, leads 22 and 23 are connected to the horizontal input ($x$-axis) while leads 18 and 19 are connected to the vertical input ($y$-axis) of a cathode ray oscilloscope (not shown). An $x$–$y$ recorder is used for direct current measurements. In the tests that were conducted a Tektronix Oscilloscope, Type 533A, and a Moseley, Type 135AM $x$–$y$ recorder were employed.

Figure 2:
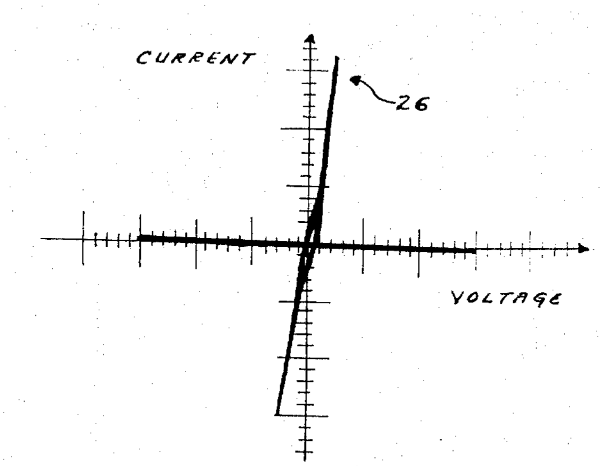

Upon application of a voltage, either alternating current or direct current, all specimens showed a high resistance (about $10^6$ ohms) until a certain threshold voltage was reached. Then the specimens having a low iron content (compositions (a) and (b) containing less than 20 mol percent $Fe_2O_3$) switched directly to the "on" or low resistance state (20 ohms). This switching was usually associated with a spark at the contact area. As illustrated in FIG. 2, the specimens remained in "on" state 26 even when the supply voltage was reduced to zero.

Figure 3:
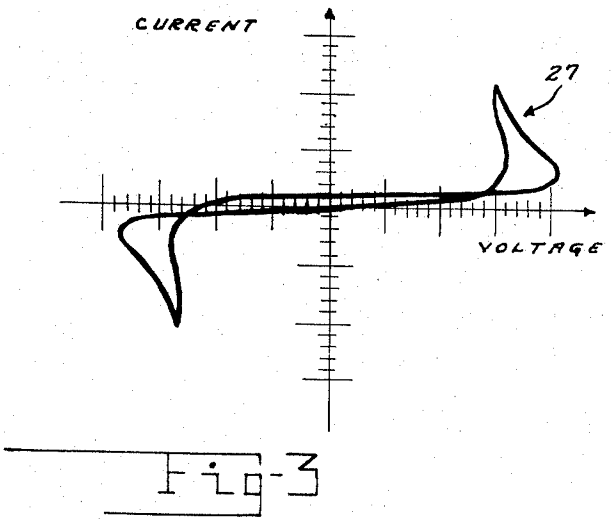
Figure 4:
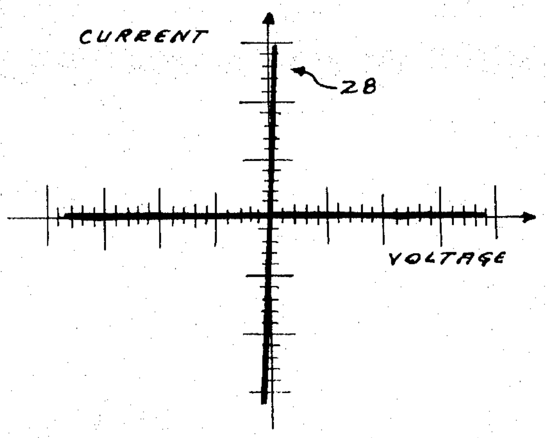

The specimens having higher iron contents (compositions (c), (d) and (e) containing more than 20 mol percent $Fe_2O_3$) showed a stable negative resistance after reaching the threshold voltage and no spark was observed. As shown in FIG. 3, the same phenomenon resulted, i.e., a stable negative resistance 27, when the voltage was reduced to zero and then reapplied. However, when a critical current was exceeded in this negative resistance area, as shown in FIG. 4, the specimens switched to low resistance "on" state 28 (20 ohms) and remained in this state with a memory effect.

It was found from the tests that the threshold voltage for switching decreased uniformly with increasing iron contents of the specimens. For the specimens containing 14 mol percent $Fe_2O_3$, the threshold voltages were about 700 volts. Specimens of the same thickness and containing 27 mol percent $Fe_2O_3$ had threshold voltages of about 300 volts.

EXAMPLE II

A glass composition was prepared by mixing together in the dry state 37.1 grams of boric acid (0.6 mol), 22.52 grams of calcium carbonate (0.225 mol), and 35.9 grams of ferric oxide (0.225 mol). The mixture was then melted in a zircon crucible at 1200° C. under normal atmospheric conditions for about 3 hours. The resulting glass was poured to a depth of 0.5 cm. into molds having a 2 cm. diameter and then annealed at 550° C. The composition of the glass in mol percentages was as follows:

$$40B_2O_3 \cdot 30CaO \cdot 30Fe_2O_3$$

In order to obtain threshold voltages even lower than those reached in Example I, thin films were prepared of the glass composition containing 30 mol percent $Fe_2O_3$. This was accomplished by remelting a disc of the glass, prepared as described above, in a molybdenum boat (about 2 cm. in length and 0.1 mm. thick) under a vacuum. Each specimen was cooled down to room temperature in about one minute. A firmly adherent film (about 0.1 mm. thick) in good contact with the molybdenum boat was obtained.

Figure 5:
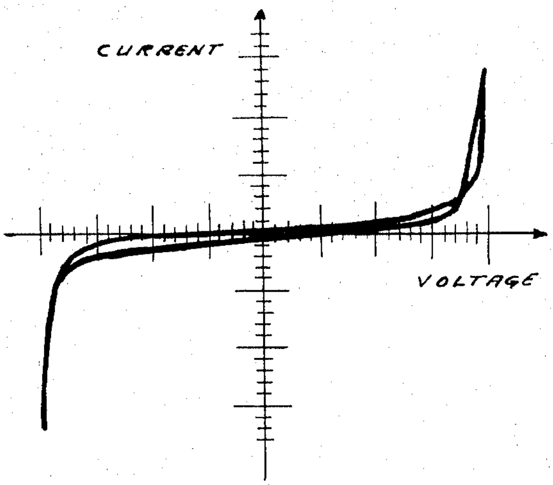

The thin films containing 30 mol percent $Fe_2O_3$ were tested in the circuit shown in FIG. 1. In FIG. 5, there is shown the effect of applying a 50 cycle alternating current voltage to the specimens. The film specimens behaved as a voltage stabilizer up to currents of 8 milliamperes. The same behavior was obtained when the tungsten whisker electrode was moved to any other point on the films.

Several unexpected results were obtained with the specimen containing 30 mol percent $Fe_2O_3$. Upon application of an alternating current (or direct current) voltage, the specimen remained in the "off" state with a very large resistance (about $10^6$ ohms). Then at a threshold voltage (about 20 volts) it switched directly and almost instantaneously to the "on" state having a low resistance (about 20 ohms). The specimen remained in the "on" state even when the supply voltage was reduced to zero. Thus, a memory effect was exhibited. Now, with the supply voltage turned off, the specimen was reverted from the low resistance state to the high resistance state by applying a current pulse (8 volts height and 1 msec. duration) from a pulse generator (Tektronix type 114). The same reversible behavior was obtained for the specimen at the same point without any variation in its behavior. Shifting of the tungsten whisker electrode to other contact points on the film specimen invariably gave the same result. The phenomenon is reversible, i.e., a threshold voltage is necessary to switch the device from the high to the low resistance (memory) state, and a pulse is necessary to revert the memory behavior instantaneously to the "off" state. The threshold voltage remained substantially constant (about 20 volts) during repetition of the process for the same specimen.

EXAMPLE III

Thin films containing 32 mol percent $Fe_2O_3$ were prepared in substantially the same manner as described in Example II. The composition of the glass in mol percentages was as follows:

$$38B_2O_3 \cdot 30CaO \cdot 32Fe_2O_3$$

Figure 6:
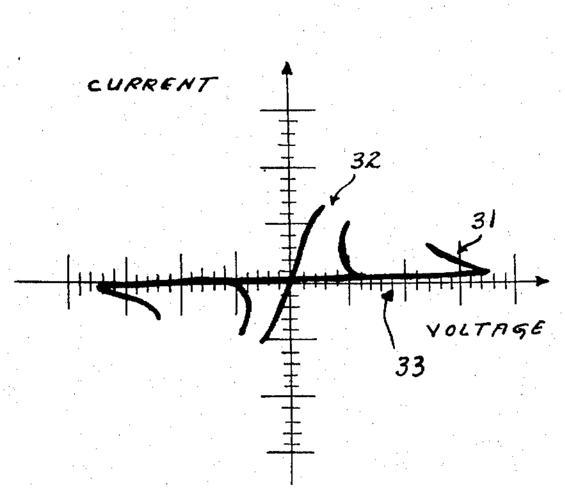

A specimen of the film was tested in the circuit shown in FIG. 1. As shown in FIG. 6, three curves were recorded for the same specimen in succession to determine the effect of increasing the current on its current-voltage characteristics. The same results were obtained by pressing the tungsten whisker electrode on any other point on the film. As seen from the curves, the applied voltage was increased until a threshold voltage was reached after which there was a region of a negative resistance 31. When a critical current was exceeded in the negative resistance region, the specimen switched to the low resistance "on" state 32. After reaching the low resistance "on" state, cooling of the specimen with liquid nitrogen was required to revert to high resistance "off" state 33.

From the foregoing examples, it is seen that the glass composition of this invention shows both switching and memory effects. The glass is, therefore, particularly suitable for use in fabricating memory switching devices for digital equipment. Also, the glass in powder form can be employed in making thermistors. It is preferred that the glass composition contain more than 20 mol percent, e.g., 20 to 35 mol percent, ferric oxide since compositions containing lesser amounts require higher threshold voltages. The preferred glass composition is one containing the molar percentages of $40B_2O_3 \cdot 30CaO \cdot 30Fe_2O_3$. The direct current resistivity of this preferred glass ranges from about $10^6$ ohm cm. at 120° K. to about $1.2 \times 10^2$ ohm cm. at 700° K.

As will be evident to those skilled in the art, various modifications of this invention can be made in the light of the foregong disclosure without departing from the spirit or scope of the invention.

We claim:

1. A glass suitable for use in fabricating an electrical switching device consisting essentially of the composition represented by the following formula in which the numerical ranges are mol percentages:

$$(35\text{–}60)B_2O_3 \cdot (20\text{–}55)M_xO \cdot (10\text{–}35)Fe_2O_3$$

wherein M is an alkaline earth metal and $x$ is equal to 1, said glass upon application of a voltage thereto showing a resistance of about $10^6$ ohms until a threshold voltage is reached at which voltage said glass when containing less than 20 mol percent $Fe_2O_3$ switches directly to a low resistance state of 20 ohms and said glass when containing more than 20 mol percent $Fe_2O_3$ shows a stable negative resistance.

2. A glass according to claim 1 in which M is barium or calcium.

3. A glass according to claim 1 having the composition represented by the following formula, the numerals in the formula being mol percentages:

$$40B_2O_3 \cdot 30CaO \cdot 30Fe_2O_3$$

4. A glass according to claim 3 in which the glass is in the form of a film having a thickness in the range of about 50 to 150 microns.

References Cited

UNITED STATES PATENTS

| | | | |
|---|---|---|---|
| 3,236,686 | 2/1966 | Schaefer | 106—47 R |
| 3,630,667 | 12/1971 | Shirk | 106—47 R |

ALLEN B. CURTIS, Primary Examiner

M. L. BELL, Assistant Examiner

U.S. Cl. X.R.

252—62.58, 519